United States Patent [19]

Nicholson

[11] Patent Number: 4,501,472
[45] Date of Patent: * Feb. 26, 1985

[54] TUNABLE ELECTROCHROMIC FILTER

[75] Inventor: Margie M. Nicholson, San Marino, Calif.

[73] Assignee: Rockwell International Corporation, El Segundo, Calif.

[*] Notice: The portion of the term of this patent subsequent to Jun. 26, 2001 has been disclaimed.

[21] Appl. No.: 451,294

[22] Filed: Dec. 20, 1982

Related U.S. Application Data

[63] Continuation-in-part of Ser. No. 327,856, Dec. 7, 1981, Pat. No. 4,456,337.

[51] Int. Cl.³ .............................................. G02F 1/23
[52] U.S. Cl. ..................................... 350/357; 350/353
[58] Field of Search ...................... 350/353, 357, 311

[56] References Cited

U.S. PATENT DOCUMENTS 3,864,589  2/1975  Schout et al.
4,184,751  1/1980  Nicholson .................... 350/357
4,239,350  12/1980  Morita et al.
4,240,713  12/1980  Leibowitz Primary Examiner—Bruce Y. Arnold
Attorney, Agent, or Firm—Gilbert H. Friedman; H. Fredrick Hamann

[57] ABSTRACT

A device usable as a tunable light filter or as a light valve having an electronically isolated element of a solid, insoluble material capable of reversibly changing state by reaction with soluble reactants. The state-changing element receives the reactants by diffusion through an electrolyte from a generator electrode.

10 Claims, 2 Drawing Figures

4,501,472

TUNABLE ELECTROCHROMIC FILTER

The invention herein described was made in the course of or under a contract or subcontract thereunder with the Department of the Air Force.

CROSS-REFERENCE TO RELATED APPLICATIONS

This is a continuation-in-part of application Ser. No. 327,856 filed Dec. 7, 1981 now U.S. Pat. No. 4,456,337.

BACKGROUND OF THE INVENTION

1. Field of the Invention

The invention relates to the field of electrically tunable optical or light filters and values in which a filter element is caused to change or switch color or is caused to switch between light transmissive and opaque in response to a chemically transmitted electrical signal.

2. Description of the Prior Art

Optical filters for light in the visible range ordinarily contain colored compounds or thin layers of materials that achieve wavelength specificity through interference effects. These conventional filters have fixed absorption characteristics which cannot be varied, or "tuned," once the filter is constructed.

Rare-earth diphthalocyanines are known from prior publications to have electrochromic properties in which the color of the diphthalocyanine can change over a period of about eight seconds upon application of a potential difference across an electrochemical cell having a diphthalocyanine film on one of the electrodes. P. N. Moskalev and I. S. Kirin, "Effect of the Electrode Potential on the Absorption Spectrum of a Rare-Earth Diphthalocyanine Layer," Opt. i Spektrosk, 29, 414 (1970) and P. N. Moskalev and I. S. Kirin, "The Electrochromism of Lanthanide Diphthalocyanines," Russian J. Phys. Chem., 46, 1019 (1972).

U.S. Pat. No. 4,184,751 of M. M. Nicholson, the inventor herein, describes the use of metal diphthalocyanine complexes as the electrochromically active material in an electrochromic display cell. Rapid color changes in less than 50 milliseconds are achieved, thus alleviating the slow switching time previously reported for rare-earth diphthalocyanine complexes. Power requirements are small because of the low power switching characteristics of the material and because the device exhibits an open circuit memory of from several minutes to several hours, depending on its construction. A multi-color, i.e., more than one color, device is achieved through use of a range of voltages applied between generator and counter electrodes. Color reversal of displayed information and the background against which it is displayed is achieved through use of display electrodes in the background portions of the viewing area as well as in the character segments.

SUMMARY OF THE INVENTION

Briefly, and in general terms, the invention is concerned with a color filter for light wherein the color of the filter is electronically tunable. The filter element is an electronically isolated, light transmissive film of an insoluble material which is capable of reversibly changing or switching its color by reaction with soluble oxidizing and reducing agents. The soluble reactants are electrochemically generated at a generator electrode and are transported to the filter element by diffusion through a thin layer of electrolyte.

A film of the color-changing filter material used in this invention is preferably supported on an inert, insulative and transparent substrate of a fully compatible material. There is no need to dispose the color-changing material on a conductive transparent material such as tin oxide. Furthermore, by matching the thermal expansion coefficient of the substrate to that of the filter material, the adhesion between them should be relatively high. This factor will tend to increase the useful life of a filter device in accord with the invention.

Since a transparent plastic can be used for the insulative substrate instead of glass, resistance to breakage can be increased.

When filter material is disposed directly on an electrode, certain deleterious effects can occur. For example, cathodic hydrogen evolution can cause a lutetium diphthalocyanine film to peel away from a tin oxide electrode. If, as in the invention, the color-changing material is not on an electrode surface, this problem cannot occur. In the present invention, the filter material can be on any suitable substrate, whether nonconductive or conductive.

Since a device in accord with the invention uses an insoluble color-changing material rather than a soluble one, refreshing is not required. Hence the average power is low. Furthermore, due to its retention feature the most recently selected filter color is not lost in the event of a power failure.

The rare-earth diphthalocyanines are useful as electrochromic materials disposed directly on electrodes due, in part, to their relatively high solid-state conductivities. Of course, these materials are also expected to be well-suited for use in this invention. However, depending on the chemical kinetics, it is believed that it may be possible to use in this invention many other materials that can change color reversibly but which lack high solid-state conductivity or other properties favorable to a direct electrochromic response. This broad aspect of the invention exists because the color change reactions therein are essentially chemical rather than electrochemical.

A limiting case of this filter results in an electronically switchable light valve which will be realized when the material of the filter element is capable of reversibly changing its light transmission characteristic from light transmissive in one state to opaque in another state.

DESCRIPTION OF THE PREFERRED EMBODIMENTS

Figure 1:
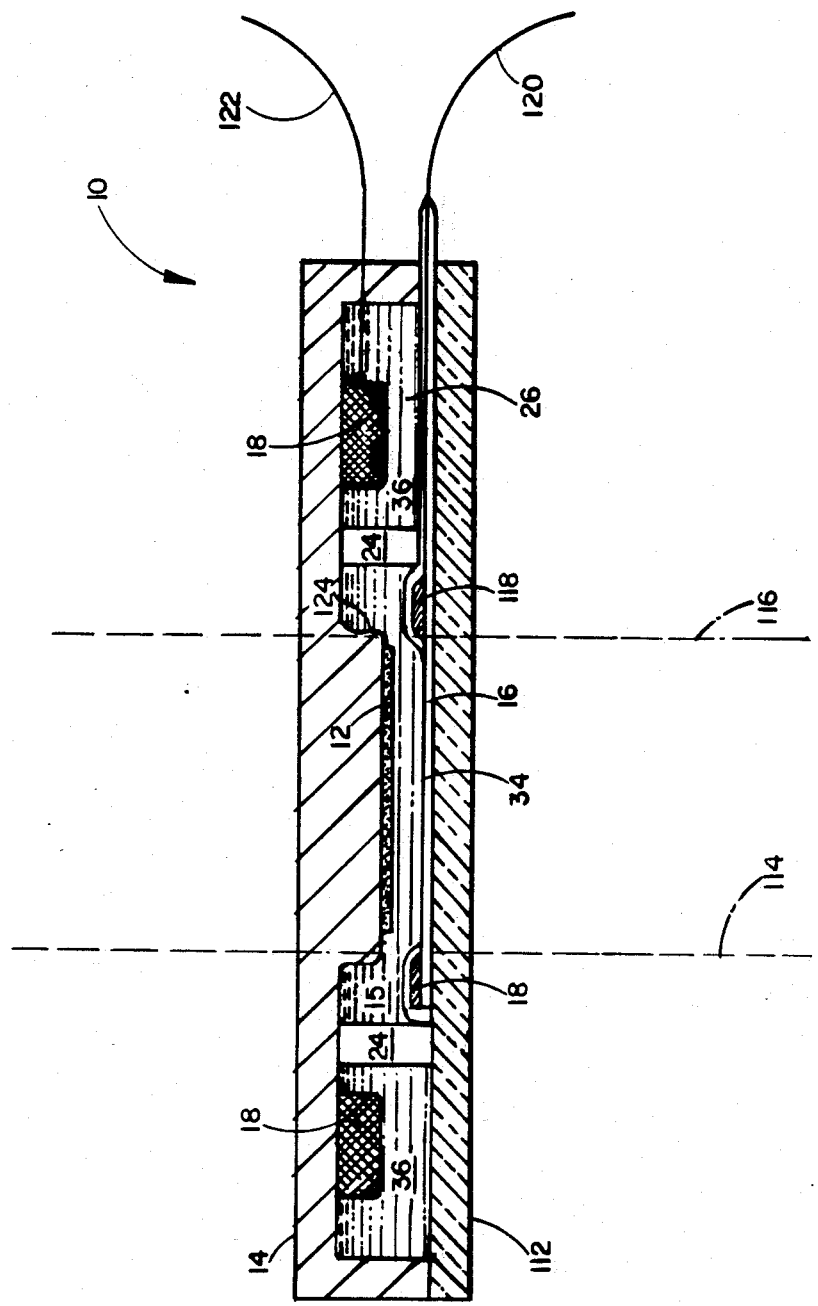
FIG. 1 is a cross-section of an optical filter in accord with the invention.

Referring now to FIG. 1, there are shown the essential parts of a chemically coupled, color-changing, optical filter 10. As shown, a cell housing for the filter 10 includes an upper portion 14 and a lower portion 112 enclosing a cell housing cavity 15. A filter element 12 comprising a light-transmissive film of an insoluble color-changing material is disposed on an interior surface of the upper cell housing portion 14. The filter element 12 may be of any insoluble color-changing material such as, for example, a multicolor rare-earth diphthalocyanine, a two-color (blue and white) indigo dye or other insoluble dye which is capable of reversibly changing color by reaction with soluble oxidizing and reducing agents that are electrochemically generated. As the thickness of a film of indigo is increased, it will reach a point where it is essentially opaque in its blue optical state while it will remain capable of transmitting a substantial amount of light in its white optical state. This latter characteristic of indigo makes it suitable for use in a light valve.

The upper cell housing portion 14 may be of any material which is compatible with the color-changing material such as, for example, a plastic, glass or alumina.

The housing material and the color-changing material preferably have substantially the same thermal expansion coefficient so as to promote good adhesion. The better the adhesion, the longer will be the life of the device 10.

In order for the device 10 to act as a light filter, both the upper portion 14 and the lower portion 112 of the cell housing must be transparent, at least in the region between dotted vertical lines 114 and 116 which are disposed to indicate the extent of the filter element 12. Dotted vertical lines 114 and 116 thus indicate the region traversed by a beam of light passing through the filter 10.

The remainder of the device parts in FIG. 1 comprise the drive means for electrochemically generating the reactants, i.e., the soluble oxidizing and reducing agents. The reactants interact with the color-changing material to alter its color.

The drive means includes a generator electrode film 16 of a transparent conductive material such as, for example, tin oxide formed on the inner surface of the lower portion 112 of the cell housing. Generator electrode film 16 is disposed substantially parallel to, spaced apart from and coextensive with the filter element 12.

Electrical contact with the generator electrode film 16 is preferably made everywhere along the outer edge of the film through a peripheral strip of metal 118 and a conductor 120 extending external to the cell housing through a seal. Such geometry limits the ohmic resistance of the conductive film 16 to less than that of one square of the conductive material, even where the total area of the film 16 is large. This limitation on the electrical resistance of the generator electrode favors uniform and rapid response over the entire area of the filter element 12.

A counter electrode 18 is shown disposed on the interior side of the upper portion 14 of the cell housing. Since the central portion of the cell is shown occupied by the filter element 12, the counter electrode 18 is shown disposed around the outer portion of the cell housing cavity 15. A conductor 122 provides an electrical path leading from the counter electrode 18 external to the cell housing through a seal.

The cell housing cavity 15 is filled with a body of electrolyte solution 26 in contact with the generator electrode 16, the filter element 12 and the counter electrode 18.

Interposed between the generator electrode 16 and the counter electrode 18 is a selective separator 24 which, in effect, divides the cell housing cavity 15 into two compartments. The first or central compartment 34 contains the generator electrode 16 and the filter element 12 while the second or outer compartment 36 contains the counter electrode 18. The selective separator 24 prevents loss of electrochemically generated reactant species from the compartment 34 containing the generator electrode 16 and the filter element 12. Stated alternatively, the separator 24 excludes or confines the electrochemically generated reactant species away from the compartment 36 containing the counter electrode 18. Thus, the generated reactants are preserved for reaction with color-changing material only. In addition, the separator 24 is required to confine certain soluble chemical species to the compartment of the generator electrode 16 and filter element 12 and prevent contamination of the counter electrode 18 where these species could interfere with the operation of the counter electrode 18. Similarly, the separator 24 is required to confine certain other soluble chemical species to the compartment 36 of the counter electrode 18 and prevent contamination of the generator electrode 16 and of the color-changing material of the filter element 12 where these other species could interfere with the operation of the generator electrode 16 or with the operation of the color-changing material. However, the separator 24 does permit the passage of current-carrying ions between the generator and counter electrodes 16 and 18. A semi-permeable separator 24 made of, for example, an ion exchange resin is preferred but a retentive diffusion barrier containing electrolyte may serve as an adequate separator 24 in some cases. An ion exchange resin exhibits selective permeability due to its ability to transport primarily cations or anions. A retentive diffusion barrier retards the undesired passage of chemical species because of its microporous structure. The diffusion barrier can be a microporous structure of inert material fabricated by screening. Alternatively, the separator 24 may be a molecular filter having selective permeability due to its ability to transport only chemical species smaller than a certain size.

As has been indicated, the generator electrode 16 is preferably of a conductive, inert material such as, for example, tin oxide. The counter electrode 18 preferably includes an electrochemical couple with insoluble active components, such as silver-silver bromide, which will not impose special requirements on the separator 24. Soluble counter electrode couples such as iodide-triiodide are not ruled out, however, if an appropriate separator 24 is used. If both members of the counter-electrode couple are soluble, as in the case of iodide-triiodide, the separator 24 must be retentive enough to exclude the more active member, such as triiodide, from the region of the filter element 12.

The portion of the electrolyte solution 26 in contact with the filter element 12 and the generator electrode 16 initially contains a component of each of two redox couples. As indicated above, any components of the redox couples that would interfere with the operation of the counter electrode 18 are excluded or confined away from the region of the counter electrode 18 by the separator 24. The initial component of one redox couple is in the reduced form while the initial component of the other redox couple is in the oxidized form. The electrolyte solution 26 may also include an inert supporting electrolyte. This may be a simple inorganic salt such as, for example, potassium chloride. The initial redox couple components must be compatible with one another and with the color-changing material of the filter element 12 so that no color change or other change occurs until an electrical signal is applied to the device.

Chemically, the operation of the device 10 is similar to that of indirect coulometry, a technique developed for the investigation of redox processes in biological materials that are sterically unable to react directly at an electrode surface. See F. M. Hawkridge and T. Kuwana, "Indirect Coulometric Titration of Biological Electron Transport Components," *Anal. Chem.*, 45, 1021 (1973).

When a current is passed in the drive means with the generator electrode 16 as the anode and the counter electrode 18 as the cathode, an oxidizing agent is formed at the surface of the generator electrode 16. This reactant diffuses across the layer of electrolyte solution 26 from the generator electrode 16 to the color-changing material in the filter element 12. The oxidizing agent reacts with the color-changing material to change its color and, in the process, is regenerated as the initial redox component in the reduced state. Thus, the soluble redox system mediates, or couples, the color-changing material in the filter element 12 to the generator electrode 16 without being consumed itself. In the device 10, the anodic charge passed at the generator electrode 16 should be that required to completely convert the amount of color-changing material present in the filter element 12. On controlled electrolysis in the opposite direction, the component of the other redox couple generates a reducing agent which reacts with the oxidized color-changing material and brings it back to its initial color state. It is apparent that there is no net change in the color-changing material or the reactants. Thus, the cycle should be repeatable many times. With some color-changing materials, if the reverse electrolysis is carried further by the passage of additional cathodic charge, the color-changing material may be reduced beyond its original color state to a third or even a fourth color state. Hence, in addition to being applicable to two-color displays, the scheme of this invention is adaptable to the operation of multicolor displays wherein the color-changing material has more than two color states.

As will be apparent to those skilled in the art, the above-recited process may be reversed in that the first reactant generated may be a reducing agent to react with a suitable color-changing material to switch the material from its initial color state by reduction rather than by oxidation. It will also be apparent that further oxidized states may exist to provide additional colors.

By way of example, a suitable color-changing material for a device 10 in accordance with the invention is lutetium diphthalocyanine, often abbreviated LuH(Pc)$_2$, initially in a green color state. The initial soluble redox component in the reduced form may be the bromide anion, Br$^-$. When a current is passed in the drive means with the generator electrode 16 as the anode and the counter electrode 18 as the cathode, the bromide anion is oxidized at the generator electrode 16 to form bromine, Br$_2$. The bromine reactant diffuses across the electrolyte 26 to the filter element 12 where the lutetium diphthalocyuanine is switched from its initial green color to a red color state by oxidation. In the process, the initial redox component, the bromide anion Br$^-$, is regenerated.

The initial soluble redox component in the oxidized form may be the colorless methyl viologen (1,1'-dimethyl-4,4'-bipyridyl) cation, abbreviated MV$^{++}$. On controlled electrolysis in the reverse direction, a current is passed in the drive means with the generator electrode 16 as the cathode and the counter electrode 18 as the anode. The methyl viologen cation is reduced at the generator electrode 16 to form MV$^+$. This reactant diffuses across the electrolyte 26 to the filter element 12 where the lutetium diphthalocyanine is switched from the red color state to its initial green color state by reduction. In the process, the initial redox component, the colorless methyl viologen cation MV$^{++}$, is regenerated. Although the MV$^+$ species is strongly colored, it is present only during the switching process. Hence, it should not significantly alter the subsequent appearance of the device.

If the reverse electrolysis is carried further by the passage of additional cathodic charge, the lutetium diphthalocyanine may be further reduced beyond the green state to a blue form. The reaction sequence below illustrates the type of chemical process involved in this additional reduction.

At Generator Electrode (Generation of Reducing Agent)

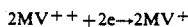

$$2MV^{++} + 2e \rightarrow 2MV^+$$

At Filter Element 12 Surface (Chemical Switching of Color-Changing Material from Green to Blue)

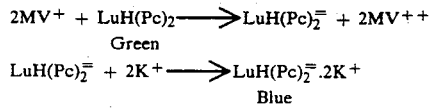

$$2MV^+ + LuH(Pc)_2 \longrightarrow LuH(Pc)_2^= + 2MV^{++}$$
$$\text{Green}$$
$$LuH(Pc)_2^= + 2K^+ \longrightarrow LuH(Pc)_2^=.2K^+$$
$$\text{Blue}$$

Net Result (Indirect Electrochemical Switching)

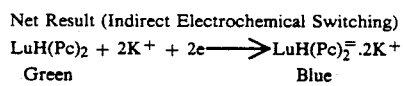

$$LuH(Pc)_2 + 2K^+ + 2e \longrightarrow LuH(Pc)_2^=.2K^+$$
$$\text{Green} \qquad\qquad\qquad\qquad \text{Blue}$$

In principal, only two redox couples are needed to cycle a diphthalocyanine film through all of its oxidation states, or colors. One redox couple should have an equilibrium potential more negative than any in the color-changing material system, and the other should have an equilibrium potential more positive than any of those for the color-changing material. It is further desired that different states of the color-changing material within a given film be capable of interacting with one another to reach equilibrium fairly quickly after passage of a switching charge. For example, in converting a lutetium diphthalocyanine film from red to green, any overdriving of the outer surface to blue should be only temporary. From observations of lutetium diphthalocyanine, it is anticipated that such equilibration can occur easily across several thousand angstroms of film thickness. Some practical relations of color and absorption spectra to potential are given in M. M. Nicholson and R. V. Galiardi, "Investigation of Lutetium Diphthalocyanine as an Electrochromic Display Material," Final Report, Contract N62269-76-C-0574, C77-215/501, NADC-76283-30, May 1977, Electronics Research Center, Rockwell International, Anaheim, Calif.

More detailed relationships between color, absorption spectra, potential, and the hydrogen ion activity of the electrolyte are given in M. M. Nicholson and T. P. Weismuller, "A Study of Colors in Lutetium Diphthalocyanine Electrochromic Displays," Final Report, Contract N00014-81-C-0264, C82-268/201, October 1982, Rockwell International Corporation, Anaheim, Calif.

Certain color conversions of lutetium diphthalocyanine have been observed. MV$^{++}$ has been electrochemically reduced to MV$^+$ which then reacted with this material to switch its color to blue from green. Br$^-$ has been electrochemically oxidized to form Br$_2$ which then reacted with this material to switch its color from green to red. With mixtures containing both couples ($MV^+/MV^{++}$ and $Br^-/Br_2$), reversible switching has been observed.

The compartment 34 of cell housing cavity 15 contains that portion of the body of electrolyte 26 having the redox components therein which are needed to react at the generator electrode 16. The compartment 36 contains that portion of the body of electrolyte 26 from which redox components are excluded unless some of them happen to be common to the counter electrode 18 system. For example, a component such as bromide ion can be one of the main redox components, so that $$2Br^- \rightarrow Br_2 + 2e$$

at the generator electrode. Sometimes the same component can be part of the counter electrode system:

$$AgBr + e \rightarrow Ag + Br^-.$$

In this case, one can use a separator 24 which is permeable to bromide ion.

The compartments 34 and 36 are shown in FIG. 1 to have substantial size for the purpose of providing an excess of reactants. Longer device life is thereby provided in the event of gradual depletion of the reactants when the device 10 is put in service. Where depletion is not a factor, the device 10 can be made more compact by making the compartments 34 and 36 smaller.

In the device 10 of FIG. 1, the displacement between the filter element 12 and the generator electrode 16 is made small relative to the other dimensions of the cell housing cavity 15 by forming an internal pedestal 124 of appropriate height on the inner side of the upper portion 14 of the cell housing.

The displacement or distance between the filter element 12 and the generator electrode 16 is preferably made very small. This is necessary for rapid switching of color, since a reactant must travel by diffusion from its generation site across the layer of the electrolyte 26 to filter element 12. For example, if the reactant has a diffusion coefficient of $1 \times 10^{-5}$ cm$^2$/sec in the liquid phase, and a switching time of one hundred milliseconds is desired, the distance between the generator electrode 16 and the surface of filter element 12 should be approximately fourteen microns. This estimate is made from the relationship (cut & paste) where $\Delta t$ is the transport time across a layer of thicknesses $\Delta X$ and D is the diffusion coefficient. With a five-micron separation distance, the response time would be reduced to approximately twelve milliseconds. These estimates are made with the assumption that the chemical color-change reaction is faster than the diffusion process.

It is convenient to cause a color change in the filter element 12 with a current pulse, rather than a voltage pulse, since it is the amount of charge passed in generating a given amount of reactant which is most closely related to the amount of color-changing material to be switched. However, a voltage pulse of suitably controlled amplitude and duration may also be used.

Figure 2:
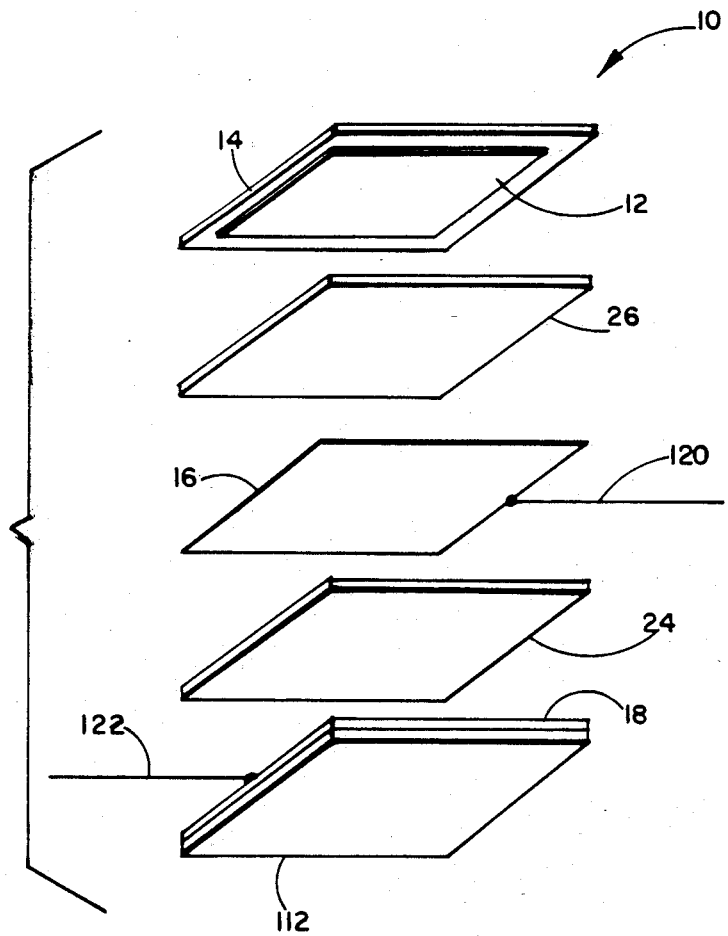
FIG. 2 is an exploded view in perspective of an alternative embodiment of an optical filter in accord with the invention.

In the device 10 of FIG. 1, the electrical path through the electrolyte 26 from the generator electrode 16 to the counter electrode 18 may have a substantial amount of electrical resistance. Where fast response of the filter is essential, an alternative arrangement may be made as in FIG. 2. In FIG. 2, ohmic voltage drop in the electrolyte is minimized by forming the device 10 as a stack of layers, sandwich fashion, with the counter electrode 18 and separator 24 disposed parallel to the planar filter element 12 of color-changing material.

Although the body of electrolyte 26 is shown as a distinct layer in the exploded view of FIG. 2, it will be understood that the electrolyte 26 is in contact with and extends from the filter element 12, disposed on the underside of upper cell housing portion 14, to the counter electrode 18, disposed on the upper side of lower cell housing portion 112. The generator electrode 16 may be, for example, of mesh to facilitate light transmission.

Although it is important to control the various thicknesses in the multilayer device structure 10 of FIG. 2, this control is not as difficult to achieve as in the fabrication of liquid crystal display devices wherein relatively large rigid plates must be positioned close together. The layer thicknesses in the present device can be achieved by screening or lamination techniques.

While the invention has been described with respect to the preferred embodiments thereof, it will be understood by those skilled in the art that various changes in form and details may be made therein without departing from the spirit and scope of the invention.

What is claimed is:

1. A device, comprising:
   an electronically isolated element of a solid, insoluble material capable of reversibly changing optical state by reaction with soluble reactants; and
   drive means for electrochemically generating said soluble reactants.

2. The device recited in claim 1, wherein said electronically isolated element is a light-transmissive film of said material whereby said device may be operated as a light filter.

3. The device recited in claim 1, wherein said electronically isolated element is a film of a material capable of reversibly changing its light transmission characteristics from light transmissive in one state to opaque in another state whereby said device may be operated as a light valve.

4. The device recited in claim 1, wherein said soluble reactants are soluble oxidizing and reducing agents.

5. The device recited in claim 4, wherein said material is an electrochromic material.

6. The device recited in claim 5, wherein said electrochromic material is a rare-earth diphthalocyanine or a diphthalocyanine of yttrium or scandium.

7. The device recited in claim 6, wherein said electrochromic material is lutetium diphthalocyanine.

8. The device recited in claim 1, wherein said drive means comprises:
   a generator electrode;
   a counter electrode; and
   selective separator means interposed between said generator electrode and said counter electrode for preventing loss of electrochemically generated soluble reactants from a compartment containing said generator electrode and said element while permitting passage of the current-carrying ions between said generator and counter electrodes.

9. The device recited in claim 8, further comprising a body of electrolyte contacting said element, said generator electrode and said counter electrode, wherein said electrolyte initially includes, confined away from said counter electrode, a component of each of two redox couples having one of the two initial components in the reduced form and the other in the oxidized form, and wherein the components of said redox couples can be electrochemically converted to produce soluble reactants for reversibly changing the state of said material.

10. The device recited in claim 8, further comprising a first body of electrolyte contacting said element and said generator electrode and a second body of electrolyte contacting said counter electrode, said first and second bodies of electrolyte having said current-carrying ions in common wherein said first electrolyte initially includes, confined away from said second body of electrolyte and said counter electrode, a component of each of two redox couples having one of the two initial components in the reduced form and the other in the oxidized form, and wherein the components of said redox couples can be electrochemically converted to produce soluble reactants for reversibly changing the state of said material.

* * * * *